United States Patent
Garg et al.

(10) Patent No.: US 11,710,313 B2
(45) Date of Patent: Jul. 25, 2023

(54) GENERATING EVENT LOGS FROM VIDEO STREAMS

(71) Applicant: Skan Inc., San Jose, CA (US)

(72) Inventors: Manish Garg, Fremont, CA (US); Mubarak Abdulla, Kerala (IN); Sanjyot Gindi, Pune (IN); Aanjan Hari, Karnataka (IN); Evgueni Hadjev, Los Altos, CA (US); Ajay Gabale, Bengaluru (IN); Avinash Misra, Plano, TX (US); Anoop Mishra, Sunnyvale, CA (US)

(73) Assignee: SKAN INC., San Jose, CA (US)

( * ) Notice: Subject to any disclaimer, the term of this patent is extended or adjusted under 35 U.S.C. 154(b) by 198 days.

(21) Appl. No.: 16/991,379

(22) Filed: Aug. 12, 2020

(65) Prior Publication Data

US 2021/0350134 A1   Nov. 11, 2021

(30) Foreign Application Priority Data

May 5, 2020   (IN) .............................. 202041019071

(51) Int. Cl.
   *G06V 20/40*   (2022.01)
   *G06N 5/04*    (2023.01)
   *G06V 30/148*  (2022.01)
   *G06V 30/10*   (2022.01)

(52) U.S. Cl.
   CPC .............. *G06V 20/40* (2022.01); *G06N 5/04* (2013.01); *G06V 30/153* (2022.01); *G06V 20/44* (2022.01); *G06V 30/10* (2022.01)

(58) Field of Classification Search
   CPC ...... G06V 20/40; G06V 30/153; G06V 20/44; G06V 30/10; G06N 5/04
   USPC .......................................................... 382/190
   See application file for complete search history.

(56) References Cited

U.S. PATENT DOCUMENTS 9,883,035 B1 *   1/2018   Kulkarni ............. G06F 11/3438
2019/0361872 A1 * 11/2019   Wulf ...................... G06Q 50/22
2020/0410052 A1  12/2020   Wiegmann

OTHER PUBLICATIONS

United States Office Action, U.S. Appl. No. 16/991,388, dated Aug. 17, 2018, 2022, 11 pages.
United States Office Action, U.S. Appl. No. 16/991,379, dated Aug. 16, 2022, 14 pages.

* cited by examiner

*Primary Examiner* — Ayodeji O Ayotunde
(74) *Attorney, Agent, or Firm* — Fenwick & West LLP

(57) ABSTRACT

A process mining system performs process mining using visual logs generated from video streams of worker devices. Specifically, for a given worker device, the process mining system obtains a series of images capturing a screen of a worker device while the worker device processes one or more tasks related to an operation process. The process mining system determines activity labels for a plurality of images. An activity label for an image may indicate an activity performed on the worker device when the image was captured. The activity label is determined by extracting information from pixels of the image and inferring the activity of the worker device from the extracted information. The process mining system generates event logs from the visual logs of worker devices and uses the event logs for process mining.

21 Claims, 12 Drawing Sheets

Activity Label: ProcessYourInvoice
{Due Date, 2/3/2020}, {Discount, NO}, {Item, Pens}, {Description, Ballpoint-Black}, {Unit Cost, $1.99}, {Quantity, 1000}, {Total $1,990}, {Subtotal, }, {Paid to Date, }, {Balance Due, }

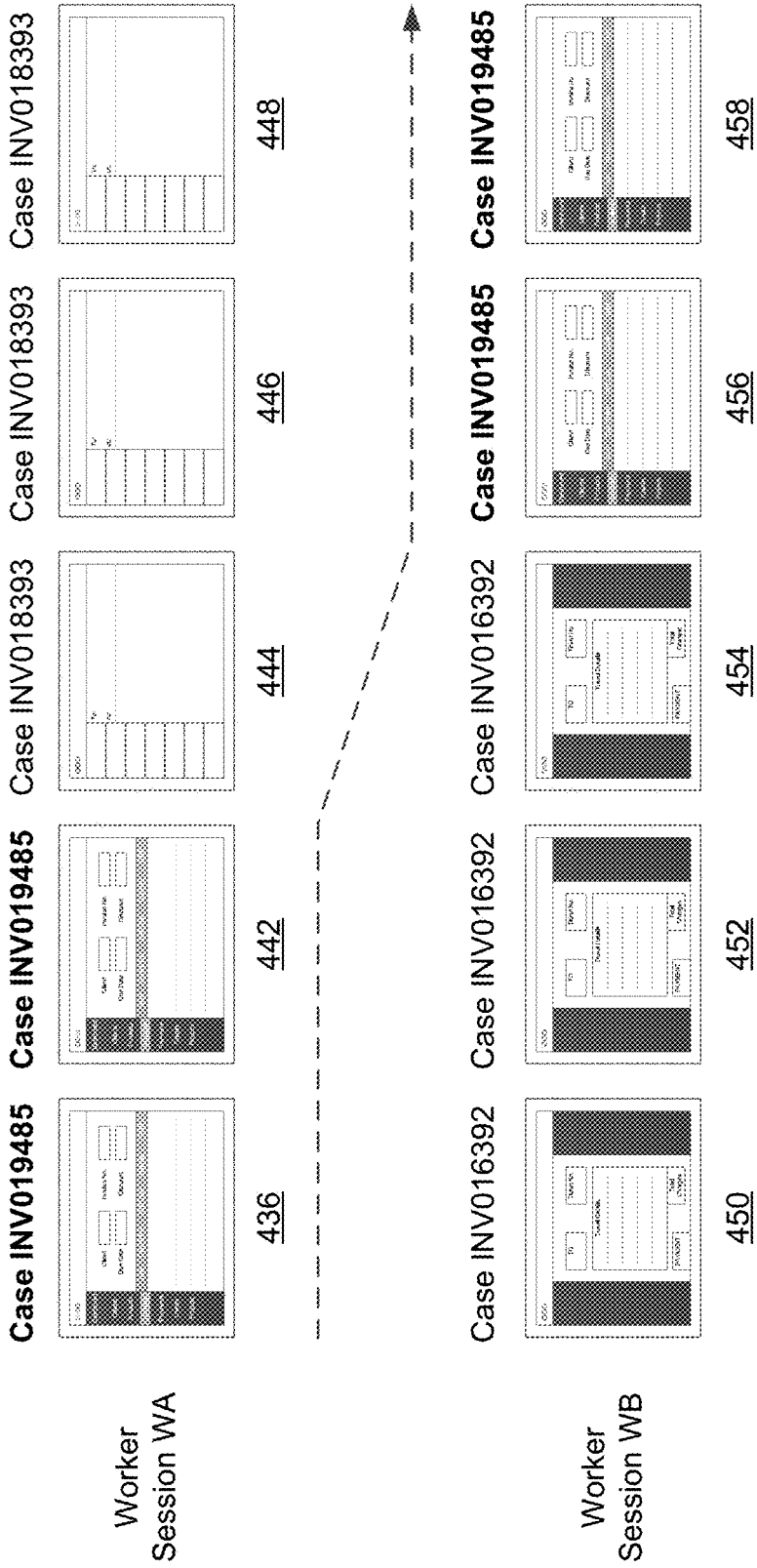

760

| Name | Application No. | Processor | | Loan Amount |
|---|---|---|---|---|
| John S. | APP03827 | Philipp N. | | $637,000 |
| Emily R. | APP03320 | James K. | | $123,000 |
| Jamie M. | APP092783 | James K. | | $125,000 |
| Thomas K. | APP083626 | Philipp N. | | $50,000 |
| Emily R. | APP038573 | King L. | · · · | $400,000 |
| Misty H. | APP123857 | King L. | | $342,000 |
| Jane K. | APP048375 | Philipp N. | | $130,000 |
| Kanye W. | APP947365 | Latham W. | | $235,000 |
| Kanye W. | APP485720 | Nancy W. | | $349,000 |

Case INV019485

Worker ID: WA, Activity Label: ProcessYourInvoice,
Time Stamp: 1/23/2020 12:34pm Worker ID: WA, Activity Label: ProcessYourInvoice,
Time Stamp: 1/23/2020 12:38pm Worker ID: WB, Activity Label: ViewYourEmail,
TimeStamp: 1/23/2020 2:39pm Worker ID: WB, Activity Label: ProcessYourInvoice,
Time Stamp: 1/23/2020 3:45pm Worker ID: WB, Activity Label: GetApproval,
Time Stamp: 1/24/2020 11:23am

GENERATING EVENT LOGS FROM VIDEO STREAMS

CROSS-REFERENCE TO RELATED APPLICATIONS

This application claims priority to Indian Patent Application No. 202041019071, filed on May 5, 2020, which is hereby incorporated by reference in its entirety.

BACKGROUND

This invention generally relates to generating event logs for process mining, and more specifically to generating event logs from videos streams of worker devices.

An operation process for an organization is a collection of related tasks in a sequence that serves a particular goal of the organization. The goal of the operation process may serve a third-party, such as a customer or client of the organization, or may serve an internal purpose. For example, an operation process may be a business process, such as invoice processing, that handles incoming invoices from arrival to payment. As another example, an operation process may be a mortgage application process that handles mortgage applications from receipt to approval. A significant number of operation processes may occur at all levels of the organization and are performed by workers affiliated with the organization such as employees, contractors, and vendors using worker devices.

An operation process may be completed in different ways depending on who processes which tasks, and thus, each completed instance of the process may vary with respect to order of interim steps and characteristics such as accuracy or efficiency. Process mining techniques can be employed to identify and visualize patterns, trends, and other details of the operation processes such that the process flow can be improved. Typically, these techniques involve analyzing structured event logs that record a series of actions occurring while a worker device is processing the tasks related to an operation process. The event logs are generated by native monitoring software on the worker device that detects certain types of actions for recording. These actions may include accessing, deleting, adding a file or an application on the worker device, for example, accessing and closing an invoice processing application. A process mining system may apply process mining techniques to event logs to analyze the operation processes.

However, process mining may be difficult to perform on event logs, since they only capture the completed states of intermittent actions and do not capture various interactions between the worker and the worker device that might provide valuable insight into the processes. Moreover, variations such as handover of tasks from one worker to another can further complicate the analysis. Alternatively, while human operators can directly observe the workers to determine other actions than those captured in event logs, this quickly becomes time-consuming and infeasible as organizations often have thousands or even millions of worker devices processing tasks.

SUMMARY

A process mining system performs process mining using visual logs generated from video streams of worker devices. Specifically, for a given worker device, the process mining system obtains a series of images capturing a screen of a worker device while the worker device processes one or more tasks related to an operation process. The process mining system determines activity labels for a plurality of images. An activity label for an image may indicate an activity performed on the worker device when the image was captured. The activity label is determined by extracting information from pixels of the image and inferring the activity of the worker device from the extracted information. The process mining system generates event logs from the visual logs of worker devices and uses the event logs for process mining.

By generating visual logs from video streams of worker devices, the process mining system can obtain a more comprehensive view of operation processes that was previously not present in conventional event logs. Specifically, visual logs allow the process mining system to obtain various interactions between the worker and the worker device that can provide valuable insight into how the processes can be improved. The visual logs capture varying levels of detail, from information on individual activities to when handover of tasks from one worker to another occur, and thus, can provide a holistic view of operation processes. This allows the process mining system to identify bottlenecks and determine targeted solutions and interventions.

In one embodiment, the process mining system identifies and assigns a case identifier to the images obtained from the worker devices. Often times, an operation process is repeatedly processed for many instances or "cases," in which each instance is unique to a particular entity or transaction. The case identifier is a data value that can be used to identify the particular instance. The case identifier may be referred to by the organization with a label consistent with naming conventions of the organization. For example, each instance of a mortgage application process may be unique to the particular transaction between the lender and an applicant for a house, and the lender may assign a case identifier value of "APP-0123456" that is referred to by the lender organization as an "Application ID."

Specifically, for each image in the plurality of images, the process mining system extracts text data included in the image. The text data may include one or more data values. The process mining system determines labels for the one or more data values in the text data. The process mining system determines a case identifier specific to a case being processed in the image. The case identifier may be determined by identifying a label for the case identifier and determining the data value associated with the label as the case identifier.

By assigning case identifiers to the plurality of images obtained from worker devices, the process mining system can determine which activities are for which particular case of an operation process. Moreover, the process mining system can detect when a worker has transitioned from one case to another, or when handover of tasks from one worker to another occurred. This allows the process mining system to obtain an enhanced understanding of operation processes also at a case-by-case level.

BRIEF DESCRIPTION OF THE DRAWINGS

FIG. 6 illustrates an example handover of tasks for an operation process, in accordance with an embodiment.

FIG. 7 illustrates a record of an organization including labels and data values for previously processed instances of a mortgage application process, in accordance with an embodiment.

FIG. 8 illustrates an example event log for a particular case, in accordance with an embodiment.

Figure 1:
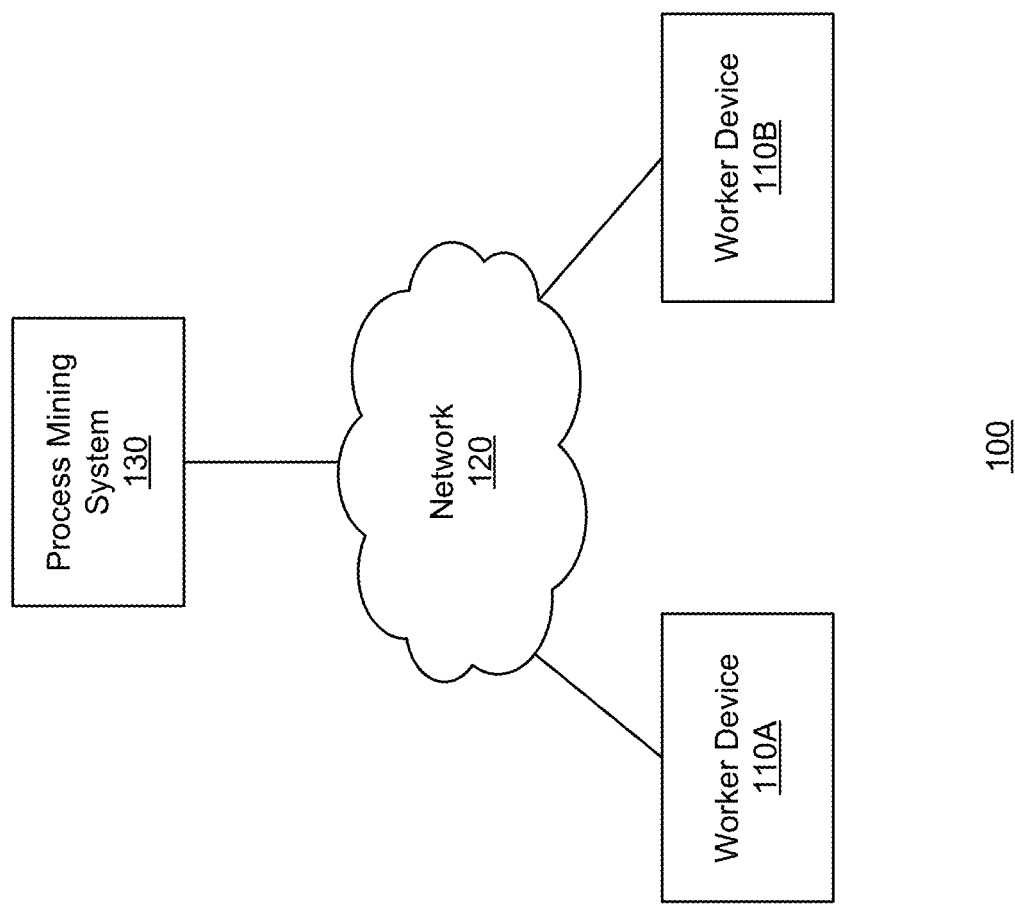
FIG. 1 is a block diagram of a system environment including a process mining system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1 is a block diagram of a system environment 100 including a process mining system 130, in accordance with an embodiment. The system environment 100 shown in FIG. 1 comprises a process mining system 130, worker devices 110A, 110B, and a network 120. In alternative configurations, different and/or additional components may be included in the system environment 100.

The process mining system 130 performs process mining using visual logs generated from video streams of worker devices 110. Specifically, for a given worker device, the process mining system 130 obtains a series of images capturing a screen of a worker device 110 while the worker device 110 processes one or more tasks related to an operation process. The process mining system 130 determines activity labels for a plurality of images. An activity label for an image may indicate an activity performed on the worker device 110 when the image was captured. The activity label is determined by extracting information from pixels of the image and inferring the activity of the worker device 110 from the extracted information. The process mining system 130 generates event logs from the visual logs of worker devices 110 and uses the event logs for process mining.

Process mining is employed to analyze operation processes within an organization, such that they can be improved with respect to accuracy or efficiency. Specifically, an operation process is a collection of related tasks in a sequence that serves a particular goal of the organization. The goal of the operation process may serve a third-party, such as a customer or client of the organization, or may serve an internal purpose. For example, an operation process may be a business process, such as invoice processing, that handles incoming invoices from arrival to payment for vendors for a company. As another example, an operation process may be a mortgage application process that handles mortgage applications from receipt to approval for customers of a lender organization.

A significant number of operation processes may occur at all levels of the organization and are performed by workers affiliated with the organization such as employees, contractors, and vendors using worker devices 110. Typically, an operation process is repeated for many instances or "cases," in which each instance may be unique to a particular entity or transaction. For example, each instance of a mortgage application process may be unique to the particular transaction between the lender and an applicant for a house, and workers of a lender organization may process thousands or millions of cases from different applicants. These processes can be further complicated when tasks span across workers in multiple groups or departments. For example, a mortgage processor may be responsible for managing the applicant's data and application timeline for a mortgage application process, while an underwriter is only responsible for reviewing and approving the applicant's finances for the loan.

While there are a common set of tasks to complete, there may be large variations in the way different workers process tasks. These variations may occur because of discrepancies in training, experience level, ways workers interact with the worker devices 110, technical issues with software applications, and the like. For example, one underwriter may complete a task within a short period of time using a single application, while another underwriter with insufficient training may complete the same task within a longer period of time by navigating through multiple applications. Thus, depending on how cases are processed, operation processes may have bottleneck instances with potential for improvement, or may have instances that work well and should be followed subsequently by other workers.

The process mining system 130 employs process mining techniques to identify and visualize patterns, trends, and other details of the operation processes such that these instances can be identified and used to improve operation processes of the organization. Process mining may include, for example, visually mapping out the sequence in which workers process tasks, or the sequence in which workers access certain applications for each instance of an operation process. As another example, process mining may also include analyzing statistics such as the time spent on various tasks. By employing these techniques, the process mining system 130 can identify points-of-interest in the process such that the organization can come up with targeted solutions and interventions to improve operation processes.

The process mining system 130 may receive requests from outside organizations to perform process mining, or the process mining system 130 may be internally affiliated with the organization itself. For example, the process mining system 130 may be affiliated with an internal department responsible for improving operation processes of the organization. Responsive to receiving a request, the process mining system 130 may be granted access to worker devices 110 and virtual worker accounts that include information the organization is interested in analyzing.

In one embodiment, the process mining system 130 performs process mining using visual logs generated from video streams of worker devices 110. By generating visual logs from video streams of worker devices, the process mining system 130 can obtain a more comprehensive view of operation processes that was previously not present in conventional event logs. Specifically, visual logs allow the process mining system 130 to obtain various interactions between the worker and the worker device 110 that can provide valuable insight. The visual logs capture varying levels of detail, from information on individual activities to when handover of tasks from one worker to another occur, and thus, can provide a holistic view of operation processes within the organization.

Figure 2:
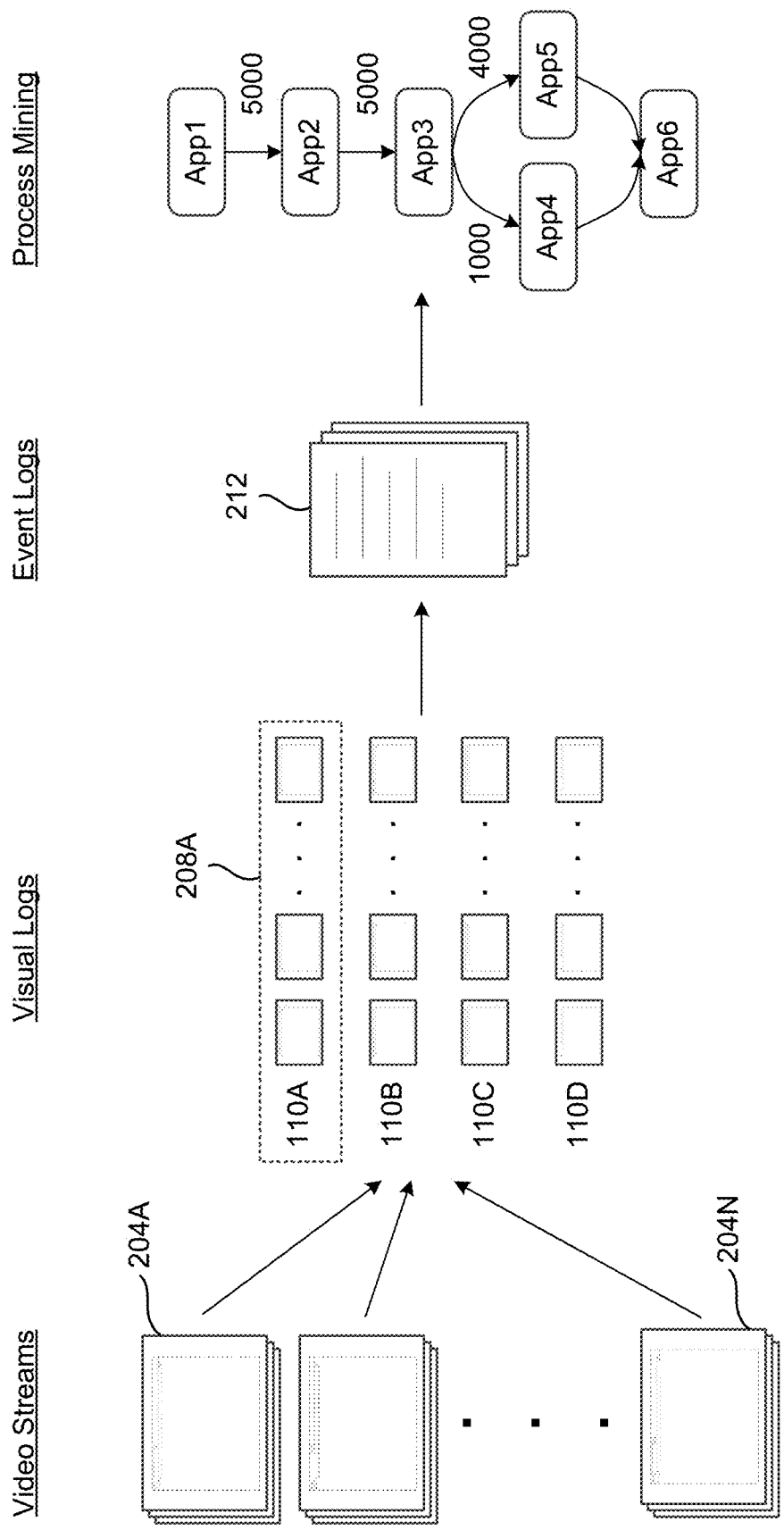
FIG. 2 illustrates a high-level process for generating event logs from video streams of worker devices, in accordance with an embodiment.

FIG. 2 illustrates a high-level process for generating event logs from video streams of worker devices 110, in accordance with an embodiment. For a given worker device 110, the process mining system 130 obtains a video stream 204 of images capturing a screen of the worker device 110 while processing one or more tasks related to an operation process on the worker device 110. The video streams 204 may be obtained from an external camera or from a software agent installed on the worker devices 110, and include images that capture applications, data values, and the like that were running and were present on the screens while the workers were processing the tasks. In the example shown in FIG. 2, the process mining system 130 obtains video streams 204A through 204N, each from worker devices 110A through 110N. The images in a video stream 204 may be associated with a session generated for a particular worker on a respective worker device 110.

The process mining system 130 generates visual logs 208 from images of the video streams 204. In one embodiment, the process mining system 130 groups images by similarity into activity groups. Images in one activity group may have similar pixel data, and thus, may be images that have similar content. The process mining system 130 generates visual logs 208 by arranging activity groups of images in chronological order. The activity groups may also be sorted by worker device or by worker session. In the example shown in FIG. 2, a visual log 208A is generated from images obtained from worker device 110A. Similar visual logs can be generated from images obtained from worker devices 110B, 110C, 110D, and so on.

The process mining system 130 extracts text data from the images of the visual logs 208. The text data may include one or more text fields identified on an image, along with the spatial location of the text field in the image. Among other things, the text data may include the name of one or more applications running on a worker device 110 or data values that were present in these applications. The process mining system 130 determines an activity label for each activity group that indicates one or more activities performed on a worker device 110 when the images were captured. The activity label may refer to the name of an application on the worker device 110 or the type of task being processed on the worker device 110. For example, the activity label may be a name of an e-mail application, a word processing application, or an invoice processing application that was detected in the image. The activity label may be inferred from the extracted text data or pixel data of the image.

In one embodiment, the process mining system 130 identifies and assigns a case identifier to the images obtained from the worker devices 110. The case identifier is a data value that can be used to identify a particular case. The case identifier may be referred to by the organization with a label consistent with naming conventions of the organization. For example, each instance of a mortgage application process may be unique to the particular transaction between the lender and an applicant for a house, and the lender may assign a case identifier value of "APP-0123456" that is referred to by the lender organization as an "Application ID." For each activity group, the process mining system 130 determines a case identifier specific to a case being processed in the activity group. The case identifier may be inferred from the text data.

The process mining system 130 generates event logs 212 from the visual logs. The event logs 212 transform information associated with the visual logs 208 to a structured form of text. In one embodiment, the format of the event logs 212 may be identical or be similar to the format of existing event logs, such that the event log could be applied to existing process mining techniques that use conventional event logs. This way, the process mining system 130 can be applied to existing process mining tools, while taking advantage of the information captured in the visual logs 204 that was previously not available for process mining. In one instance, the event logs 212 are generated for each case identifier. Specifically, the process mining system 130 may identify activity groups of images assigned to a particular case identifier, and record the timestamp of an activity group, the activity label for the activity group, and the worker account associated with the activity group in the event log 212.

The process mining system 130 performs process mining using the event logs 212. In the example shown in FIG. 2, the process mining system 130 generates a process map indicating the sequence in which workers access certain applications for a particular operation process. As shown in FIG. 2, for a total number of 5,000 cases, workers have either accessed a sequence of {App1, App2, App3, App4, App6} or a sequence of {App1, App2, App3, App5, App6} to complete the required tasks. In particular, 4,000 cases have been processed using App5, and 1,000 cases have been processed using App4. Responsive to determining that the use of App5 is a bottleneck in efficiency, the process mining system 130 may identify workers who have used App5 to process their cases, and re-train these workers to proceed with App4 instead to improve the overall efficiency of the operation process.

The worker device 110 is a computing device such as a smartphone with an operating system such as ANDROID® or APPLE® IOS®, a tablet computer, a laptop computer, a desktop computer, or any other type of network-enabled device. A typical worker device 110 includes the hardware and software needed to connect to the network 122 (e.g., via WiFi and/or 4G or other wireless telecommunication standards).

The worker device 110 allows a worker to perform tasks related to operation processes to the extent the worker is authorized to do so within the organization. The worker device 110 may include an operating system and various applications that run on the operating system that enable the workers to fulfill their tasks. For example, for a business organization, the worker device 110 may include browser applications that allows a worker in the accounting department to interact with the Internet, an invoice processing application that is used to process invoices, and the like. As another example, for a lender organization, the worker device 110 may include a mortgage processing application that mortgage officers and underwriters can use to process mortgage applications from customers.

A worker may each be associated with a unique virtual account that can be used to log into a worker device 110. In such an instance, the worker device 110 may generate and maintain a dedicated session for the account of the worker such that the worker can process tasks on the worker device 110. Thus, activities performed on the worker device 110 may be traced back to the corresponding worker through the login history of the virtual account. In another instance, the worker device 110 may generate and maintain a public session, in which multiple workers can process tasks on the worker device 110 without logging in through a virtual account. In such an instance, the worker device 110 the organization may require each worker to sign off their name on a task, and thus, the activities performed on the worker device 110 may still be traced back to the corresponding worker by analyzing the content of the images from the worker device 110. In yet another instance, it is not required to trace each activity back to the worker, and the worker name or worker account may be anonymized or replaced by a device name for the worker device 110.

The worker device 110 includes a software agent deployed by the process mining system 130 that captures video streams of a screen of the worker device 110 while the worker a processes one or more tasks related to an operation process on the worker device 110. The software agent provides the video streams to the process mining system 130. Each image received by the agent management module 310 may be associated with a time stamp indicating the time the image was taken on a respective worker device 110. In one embodiment, the software agent captures images in predetermined intervals. For example, the software agent may capture image every 5 seconds regardless of what happens on the worker device 110 as long as the worker device 110 is operating a virtual session. In another embodiment, the software agent captures an image responsive to detecting an event on the worker device 110. The event can include actions initiated by the worker, such as pressing the "tab" or "space" key on the keyboard, clicking the mouse, and the like. The software agent may be configured to append the event that triggered the capture (e.g., mouse-click, pressing "enter" key) to the image as metadata, and provide images appended with such metadata to the process mining system 130.

While the system 100 illustrated in FIG. 1 is described in conjunction with an embodiment in which the worker device 110 is a computing device with a software agent, it is also appreciated that in other embodiments, different configurations can be applied to obtain images of workers processing tasks related to an operation process. For example, in one embodiment, workers of an organization may process tasks offline on documents, and a software agent within or connected to an external camera may capture images of the documents while the worker is processing tasks related to the operation process. The images captured by the camera may be provided to the process mining system 130 as video streams.

The network 122 provides a communication infrastructure between the worker devices 110 and the process mining system 130. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

Process Mining System

Figure 3:
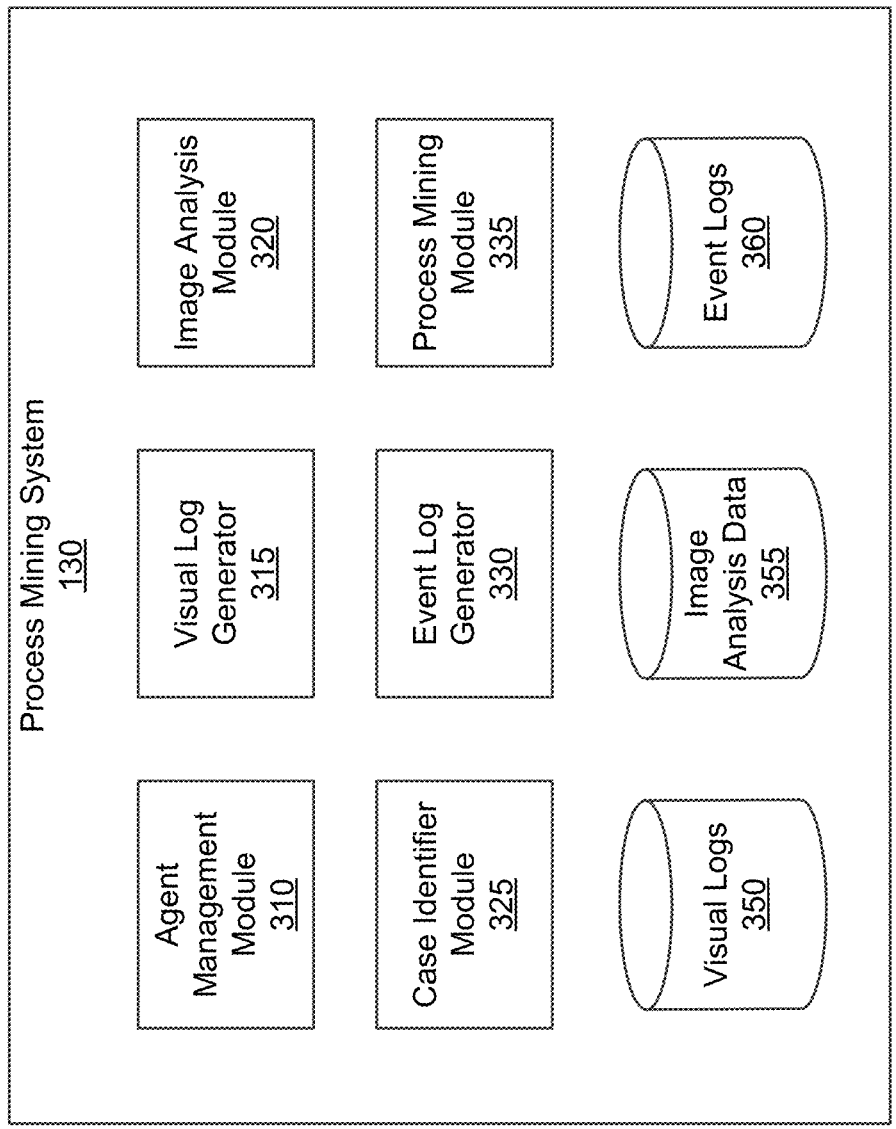
FIG. 3 is a high-level block diagram illustrating a detailed view of the process mining system, in accordance with an embodiment.

FIG. 3 is a high-level block diagram illustrating a detailed view of the process mining system 130, in accordance with an embodiment. The process mining system 130 is comprised of modules including an agent management module 310, a visual log generator 315, an image analysis module 320, an event log generator 325, a process mining module 330, and a case identifier module 335. The process mining system 130 also includes a visual logs datastore 350, an image analysis data store 355, and an event logs data store 360. Some embodiments of the process mining system 130 have different modules than those described here. Similarly, the functions can be distributed among the modules in a different manner than is described here.

The agent management module 310 develops and maintains a software agent program that capture images from worker devices 110. Specifically, responsive to receiving a request, the agent management module 310 may distribute the software agent program to worker devices 110 of the organization, such that the software agent can be downloaded and installed on each worker device 110. Alternatively, an individual associated with the process mining system 130 may install the software agent directly on each worker device 110 through, for example, a CD. Once installed, the software agent is configured to capture video streams of screens of worker devices 110 and provide the video streams to the agent management module 310. In one instance, the software agent obtains a video stream in the form of a continuous video that includes a plurality of video frame images, each taken at a predetermined interval. In another instance, the software agent obtains a video stream that includes a plurality of images each taken responsive to a key event such as the worker pressing the "enter" key or clicking on the mouse connected to the respective worker device 110.

Moreover, the software agent may be configured to selectively obtain images according to a predetermined criterion provided by the organization or the process mining system 130. For example, the software agent may be configured to detect which applications are running on the worker device 110 and obtain images only when applications of interest to the organization are running on the worker device 110.

The agent management module 310 may develop multiple versions of the software agent based on the configuration of the worker devices 110 of the organization making the request. Specifically, different organizations may have worker devices 110 with different hardware configurations and operating systems. The agent management module 310 may develop versions of the software agent program for different worker device 110 configurations. Moreover, the agent management module 310 may continuously update the software agent by providing the worker devices 110 with software update patches or bug fixes.

The visual log generator 315 generates visual logs from images of the video streams received by the agent management module 310. The visual log generator 315 groups images by similarity into activity groups. In one embodiment, the images are grouped together based on the similarity between pixel data. For example, the visual log generator 315 may determine clusters of images that have less than a threshold difference in pixel data as one activity group. As another example, the visual log generator 315 may first generate an embedding for each image using a machine-learned model and determine clusters of images that have less than a threshold difference in the embeddings as one activity group. The visual log generator 315 arranges the activity group of images in chronological order to generate the visual logs.

Figure 4:
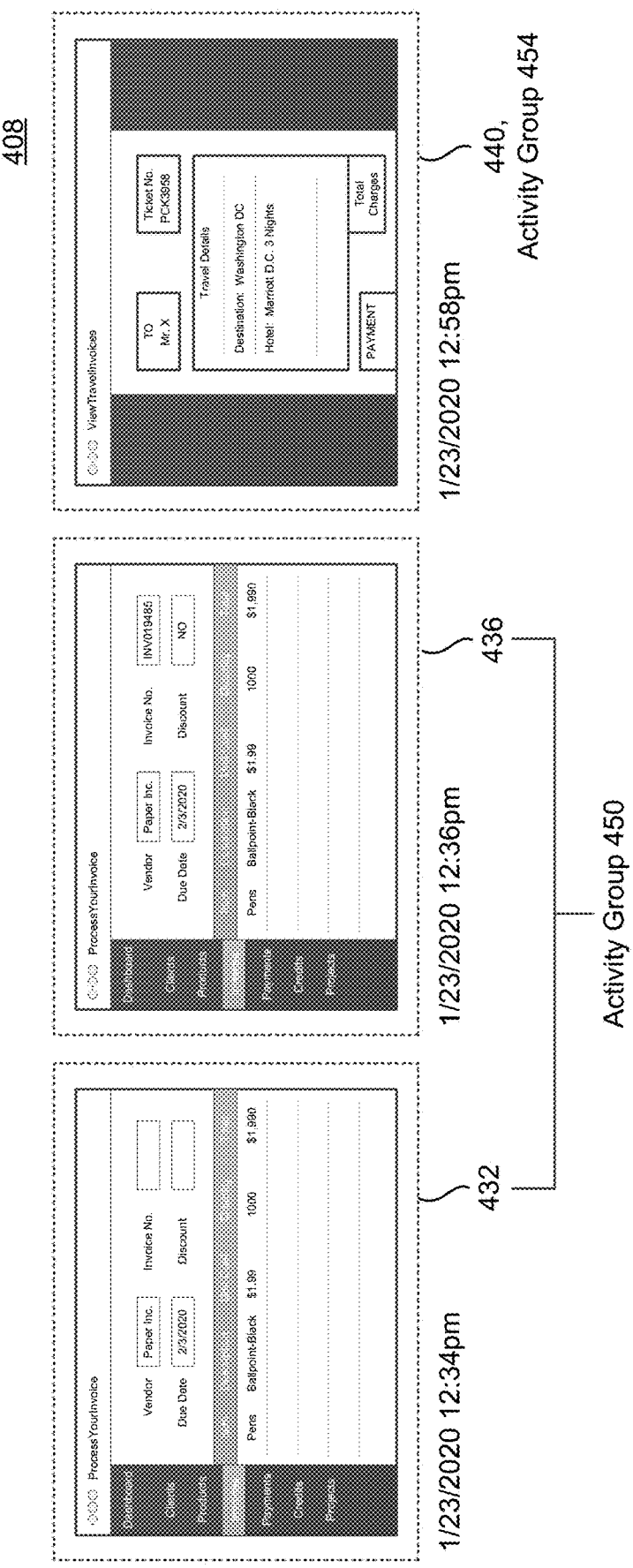
FIG. 4 illustrates an example visual log generated from a video stream of images from a worker device, in accordance with an embodiment.

FIG. 4 illustrates an example visual log 408 generated from a video stream of images from a worker device 110, in accordance with an embodiment. The visual log 408 illustrated in FIG. 4 includes images 432, 436, 440 that were obtained from a video stream from a particular worker session WA. While FIG. 4 illustrates three example images, in reality, there may be many more images obtained from the video stream for a worker session. Image 432 has a timestamp of 1/23/2020 12:34 pm, image 436 has a timestamp of 1/23/2020 12:36 pm, and image 440 has a timestamp of 1/23/2020 12:58 pm.

As shown in FIG. 4, images 432 and 436 display the same invoice processing application with similar pixel data, except that the worker has filled in additional data fields in image 436 relative to image 432. Thus, responsive to determining that the difference in pixel data of images 432 and 436 are less than a predetermined threshold, the visual log generator 315 may group images 432 and 436 as one activity group 450. Also shown in FIG. 4, image 440 displays a different travel invoice viewing application with significantly different pixel data than images 432 and 436. Thus, the visual log generator 315 may assign a new activity group 454 to image 440 alone.

In one embodiment, the visual log generator 315 may also discard images in the visual log that contain applications that are "whitelisted" by the organization. For example, a whitelisted image may contain an image of a browser application when the worker is accessing a personal social networking account. As another example, a whitelisted image may contain an image of an e-mail application showing the worker's personal account. The visual log generator 315 may receive indications from other modules of the process mining system 130 that a certain image is a whitelisted image and may discard this image from the visual logs. The list of whitelisted applications or websites may differ depending on the organization and depending on the operation process.

The image analysis module 320 extracts text data from the images that can be used to infer activity labels and data values contained in the images. In one embodiment, the image analysis module 320 extracts text data by applying a model to identify one or more text fields in the image and their relative locations in the image. In one instance, the image analysis module 332 applies optical character recognition (OCR) methods to identify the text data. In another instance, the image analysis module 320 may manage an application programming interface, such as the Microsoft Windows Automation API, to communicate with the worker devices 110 and obtain the textual data.

The text fields can include information that can be used to infer the name of an application or an online website application. For example, a text field may include the name of a native application on the worker device 110. As another example, a text field may include the URL address of a website displayed in a browser application of the worker device 110. The text fields can also include one or more data values for the application being displayed in an image. The data values may be values for one or more data fields of an application. For example, a text field may include the name of the recipient an invoice is to be paid to. As another example, a text field may include the total amount of an invoice. The data values may be associated with respective labels that the application uses to refer to the data values.

Figure 5A:
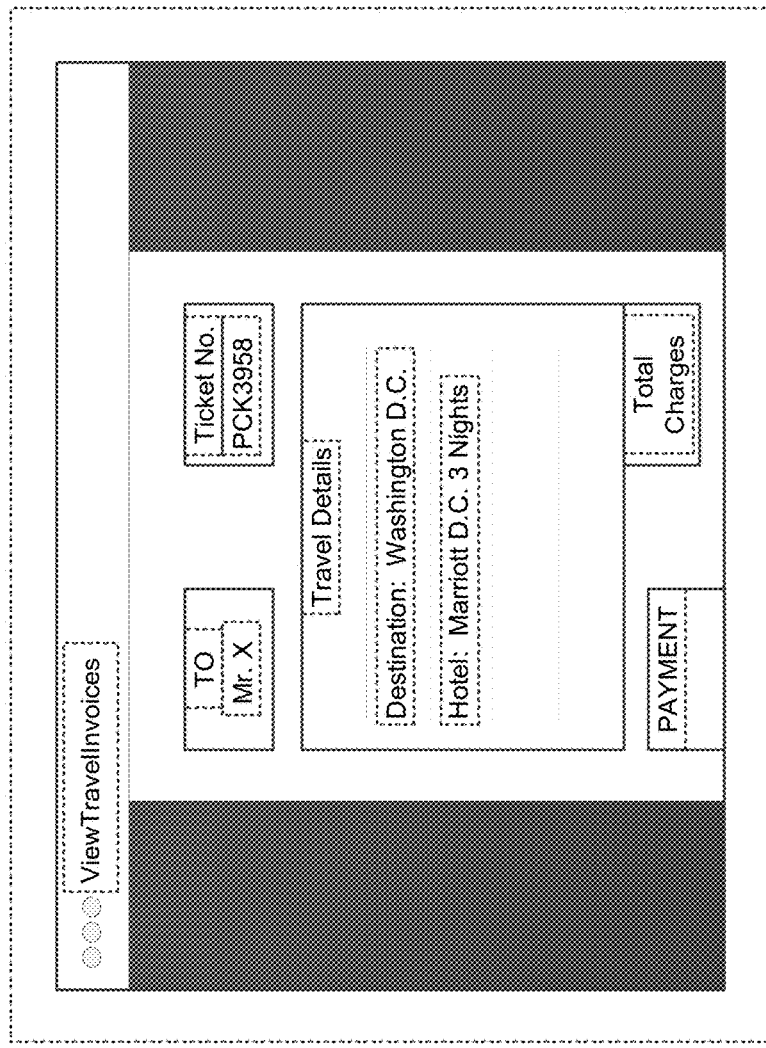
FIG. 5A illustrates text data extracted from the example image shown in FIG. 4, in accordance with an embodiment.

FIG. 5A illustrates text data extracted from the example image 440 shown in FIG. 4, in accordance with an embodiment. In particular, image 440 shows an application for viewing travel-related invoices. As shown in FIG. 5A, the image analysis module 320 performs OCR to detect text data in the image 440. The identified text data is indicated by dotted boxes in the image 440. Among other things, the text data includes a text field with the name of the application "ViewTravelInvoices." The text data also includes a text with a label for the recipient of the invoice "TO," and a corresponding text field including the data value for the recipient "Mr. X." The text data also includes a text field with a label for the description of the travel invoice "Travel Details," and a corresponding text field including the data values "Destination: Washington D.C., Hotel: Marriott D.C. 3 Nights."

Figure 5B:
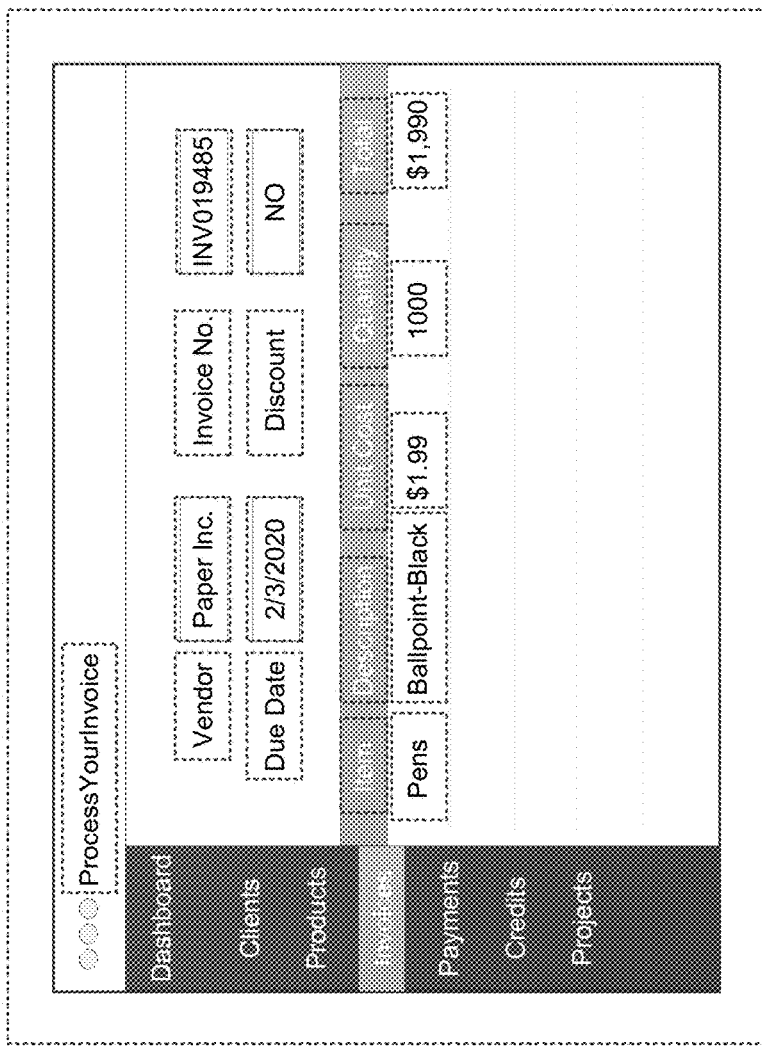
FIG. 5B illustrates another example of text data extracted from the example image shown in FIG. 4, in accordance with an embodiment.

FIG. 5B illustrates another example of text data extracted from the example image 436 shown in FIG. 4, in accordance with an embodiment. In particular, image 436 shows an application internal to an organization for processing invoices. As shown in FIG. 5B, the text data includes a text field with the name of the application "ProcessYourInvoice." The text data includes text fields with labels "Vendor," "Invoice No.," "Due Date," "Discount" and corresponding text fields with respective data values "Paper Inc.," "INV019485," "2/3/2020," and "NO." With respect to the description of the items, the text data includes text fields with labels "Item," "Description," "Unit Cost," "Quantity," "Total," and corresponding text fields with respective data values "Pens," "Ballpoint-Black," "$1.99," and "$1,990."

The image analysis module 320 also determines an activity label for each activity group in the visual logs that indicates activities performed on the worker devices 110 when the images were captured. In one embodiment, the activity label is the name of the application on the worker device 110, and the image analysis module 320 may determine the activity label from the extracted text data. For example, the image analysis module 320 may search the extracted text fields and identify a text field that matches an application in a list of applications. The identified text field can be assigned as the activity for the image. For example, the activity label for the image 440 shown in FIG. 5A may be "ViewTravelInvoices," and the activity label for the image 436 shown in FIG. 5B may be "ProcessYourInvoice."

However, embodiments are not limited hereto, and in other embodiments, the activity label may be any other characterization of the images that indicates the activities performed in the images when the images were captured at varying levels of granularity. For example, the activity label may be the type of task being performed in the image. In such an example, the activity label for the image 440 shown in FIG. 5A may be "Viewing Travel Invoices," and the activity label for the image 436 shown in FIG. 5B may be "Enter Data for Invoice." As another example, the activity label for an image may be "Enter Registration Details."

In another embodiment, the image analysis module 320 determines an activity label for an image by identifying a similarity between the image and one or more images that have known activity labels. The known activity labels for the identified images that have a similarity above a threshold with the image are assigned as the activity label for the image. For example, the image analysis module 320 may perform clustering or other unsupervised machine-learning techniques to identify a cluster of one or more images that have a similarity above a threshold with the image, and assign the known activity label for the cluster of images as the activity label for the image. The similarity may be determined as a metric that increases as a difference between the pixel data or a transformation of the pixel data between two images decreases, and vice versa.

The image analysis module 320 stores the activity labels and data values in association with the images in the image analysis data store 355. For example, in the images shown in FIGS. 5A, 5B, the stored text data for each image includes the activity label for the image and data values of the image. In particular, the data values are formatted in brackets, in which the first element of the bracket is the label for the data value, and the second element is the data value. However, embodiments are not limited hereto, and the image analysis module 320 may store the extracted text data in any available format compatible with the process mining system 130.

In one embodiment, the image analysis module 320 data may merge extracted text data from images in an activity group, such that a single set of text data is stored for images of the activity group. The image analysis module 320 may extract text data from the image with the latest timestamp in the activity group and associate the text data for the image as the text data for the activity group, since the image with the latest timestamp is likely to be the most comprehensive within the activity group. For example, returning to the example illustrated in FIG. 4, activity group 450 may be associated with extracted text data from image 436, since image 436 has the latest timestamp in the group and thus may be assigned a single activity label. In another embodiment, the image analysis module 320 may store extracted text data with respect to an individual image basis.

The case identifier module 325 identifies and assigns a case identifier to the images obtained from worker devices 110. The case identifier is a data value that can be used to identify a particular instance of an operation process. The case identifier may vary across different operation processes and organizations, even if the instances are for the same entity or transaction. For example, for the same individual in an accident, the individual may be assigned a patient identifier value at a hospital, while the insurance claim for the individual may be assigned a claim identifier value at the insurance company. The assigned case identifiers may also be stored in the image analysis data store 355 in association with images in the visual logs 350.

The case identifier module 325 may determine the case identifier from the extracted text data. The case identifier may be referred to by the organization with a particular label, or in some cases, may be identified by a particular format. The case identifier module 325 may identify a case identifier for an image from the extracted text data once the label or format for the case identifier is known. Returning to the example in FIG. 5B, responsive to determining that the label for the case identifier for invoice processing operations is "Invoice No.," the case identifier module 325 searches the stored text data for the image 436, and identifies the data value "INV019485" as the case identifier for the image. As another example, responsive to determining that the case identifier has a format of starting with "INV," the case identifier module 325 searches the stored text data to identify a data value that has the specified format.

In some cases, images may be captured that do not include the case identifier in the screen. In one embodiment, the case identifier module 325 may determine case identifiers for such images by determining similarity between data values on these images to data values on images that have already been assigned a case identifier. For example, the case identifier module 325 may compare the data values for a subset of labels in the unassigned image to those in an assigned image, and determine the similarity as the number or proportion of data values in the assigned image that match those in the unassigned image. The similarity may be determined among images obtained from the same worker session, images obtained from the same worker, or images obtained across different workers and worker devices 110. The case identifier module 325 may identify an assigned image having above a threshold similarity with the unassigned image and assign the case identifier for that image to the unassigned image.

Figure 5C:
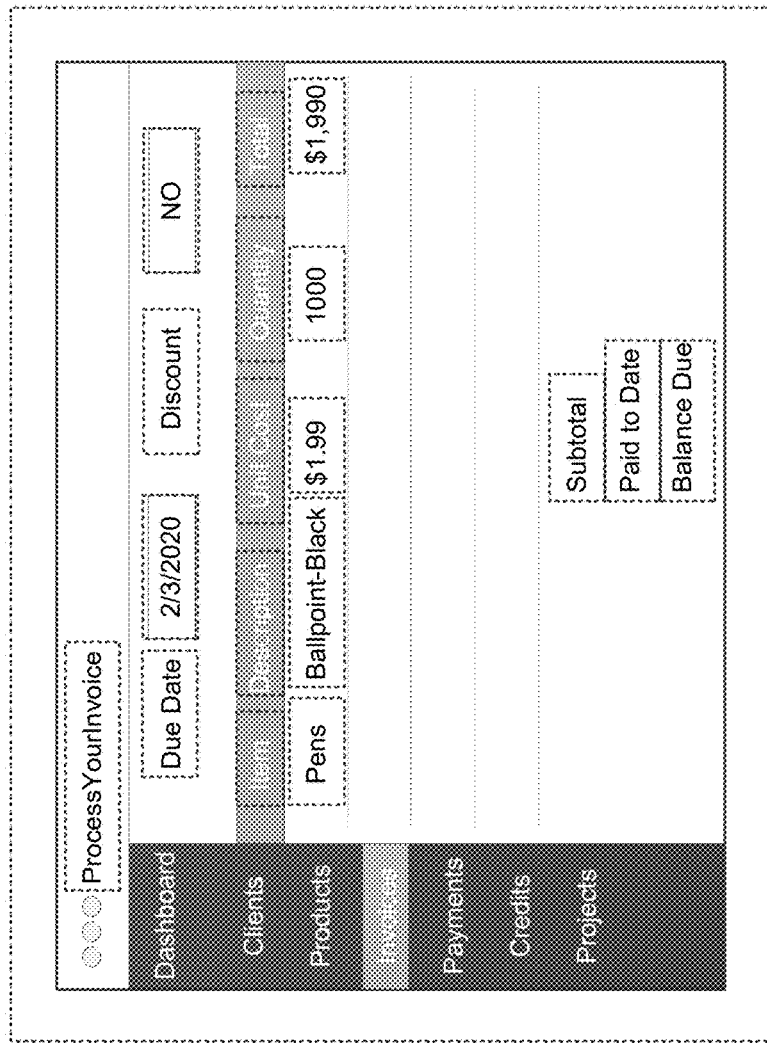
FIG. 5C illustrates an example of assigning a case identifier to an example image, in accordance with an embodiment.

FIG. 5C illustrates an example of assigning a case identifier to an example image 438, in accordance with an embodiment. In particular, the example image 438 shown in FIG. 5C may be obtained after the worker for the example image 436 in FIG. 5B scrolls to the bottom portion of the application, and thus, may be associated with the same case identifier. The case identifier module 325 compares data values for the extracted labels in the image 438 to those in the previous image 436 that already has been assigned a case identifier of "INV019485." The similarity between these two images may be significantly high since the data values in the image 438 for a subset of labels "Due Date," "Discount," "Item," "Description," "Unit Cost," "Quantity," "Total" match those of the image 436. Based on the determined similarities, the case identifier module 325 may assign the same case identifier "INV019485" to the image 438.

By assigning case identifiers to images or activity groups in the visual log, the process mining system 130 can identify when a worker has finished working on one case and started processing a different case in the operation process. Moreover, in many instances, handover of tasks for one particular case may occur from one worker to another. In such an instance, images from workers affiliated with the case can be collated to provide a more comprehensive view of the process flow of the case. For example, for a given case of an operation process, the process mining system 130 can identify the case identifier associated with the case. The process mining system 130 can identify images in the visual log assigned to the case identifier across different workers or different worker devices 110. The order in which the case was handled across workers or worker devices can be determined by, for example, analyzing the chronological order of the images based on time stamps. For example, a first subset of images may show worker A processing a particular case at a first time. A second subset of images may show worker B processing the particular case at some second time subsequent the first time. Based on this chronological order of images assigned to the particular case, the process mining system 130 may determine that a handover of this case occurred from worker A to worker B at the second time. In this manner, the process mining system 130 can determine whether a particular case was handled by different workers, and when handovers of the case occurred in the process.

FIG. 6 illustrates an example handover of tasks for an operation process, in accordance with an embodiment. As shown in FIG. 6, the process mining system 130 obtains images 436, 442, 444, 446, 448 in chronological order from worker session WA. Images 436, 442 are assigned case identifiers of "INV019485," while images 444, 446, 448 are assigned case identifiers of "INV018393." Also shown in FIG. 6, the process mining system 130 obtains images 450, 452, 454, 456, 458 in chronological order from worker session WB. Images 450, 452, 454 are assigned case identifiers of "INV016392," while images 456, 458 are assigned the same case identifier of "INV018393" with images 436, 442 from worker session WA. Thus, the process mining system 130 is able to identify that a handover of tasks has occurred from worker session WA to worker session WB, and these images can be collated to provide an overall process flow of the case.

In one embodiment, the case identifier module 325 may obtain the label or format for the case identifier from individuals affiliated with the organization, such as individuals in managerial positions. In some embodiments, the case identifier module 325 it may be difficult to obtain the label or format for the case identifier directly from the organization. In such an instance, the case identifier module 325 may obtain records from the organization that contain information about previously processed instances of an operation process and determine the label for the case identifier from the records. The records may store one or more labels and data values corresponding to these labels for the previously processed instances.

FIG. 7 illustrates a record 760 of an organization including labels and data values for previously processed instances of a mortgage application process, in accordance with an embodiment. As shown in FIG. 7, the first row of the record contains a set of labels including "Name," "Application No.," "Processor," and "Loan Amount." Each row thereafter contains data values for each label for a particular instance of the operation process. For example, the second row corresponds to an instance for a particular mortgage applicant, and contains data values "John S.," "APAP03827," "Philipp N.," and "$637,000" that respectively correspond to the set of labels. While the label "Application No." and its corresponding data values are the case identifiers for the operation process, this information may not be known to the case identifier module 325 beforehand for various reasons.

In one embodiment, the case identifier module 325 identifies the label or format for the case identifier by computing the variance for a data value. The variance for a data value indicates the frequency in which different data values appear in the record. The case identifier module 325 may calculate the variance of the data values for each label and identify labels with data values above a threshold variance. The case identifier module 325 may determine the label for the case identifier by precluding labels that do not resemble a case identifier format. In one instance, the variance for a data value may be calculated as the number of different data values over the total number of records for a given label. For example, a label for a case identifier may have 100 records each with a different identifier (i.e., 100 different case identifiers). Another label for a worker device may have 100 records each with the same worker device identifier. The label for the case identifier would have a variance of 100/100=1, and the label for the worker device would have a variance of 1/1000=0.01, and thus, the label for the case identifier would be selected with the highest variance. Since the case identifier is a data value unique to a particular instance, the variance for data values of a case identifier label will likely be higher than those for other labels.

Returning to the example shown in FIG. 6, the case identifier module 325 may compute the variances for data values in each column of the record 760. In particular, data values for the label "Processor" may have low variance since one mortgage processor may handle multiple mortgage application instances, and thus, the same mortgage processor may appear across multiple instances in the record 760. While data values for labels "Name" and "Loan Amount" may be above a threshold variance, the case identifier module 325 may preclude these labels because data values for each of these labels do not resemble a case identifier format, but are rather names for individuals and dollar amounts for loans. The case identifier module 325 may thus identify the label "Application No." as the label for the case identifier, since the data values for this label have significantly high variance, and the format resembles an identifier.

In another embodiment, the case identifier module 325 identifies the label or format for the case identifier by computing the covariance between data values for the one or more labels in the record. The covariance indicates the co-variability between data values for one label and data values for another label. The case identifier module 325 may calculate the covariance between pairs of labels and identify labels that have above a threshold covariance with other labels. The case identifier module 325 may determine the label for the case identifier by precluding labels that do not resemble a case identifier format. Since the case identifier is a data value unique to a particular instance, the data values associated with other labels will change as the case identifier value changes, the covariance for a case identifier label will likely be higher than those for other labels.

The event log generator 330 generates event logs from the visual logs 350 and image analysis data 355 stores. The event logs are a transformation of information associated with the visual logs into text. In one embodiment, the event log generator 330 generates event logs for each case identifier of an operation process and may identify activity groups of images that are associated with the particular case identifier. In one instance, the event log for a case includes activity label, time information including the start and stop time stamps for the activity, and the worker identification for each activity group of images. In other instances, the event log may also include any combination of labels and data values extracted from the images. In another embodiment, the event log generator 330 can generate event logs for each worker, worker device 110, and the like. The event logs are stored in the event log store 360.

FIG. 8 illustrates an example event log 880 for a case, in accordance with an embodiment. As shown in FIG. 8, the event log 880 is generated for the case "INV019485." Also shown in FIG. 8, each row of the event log 880 corresponds to an activity group of images detected for the case, and includes the worker ID, the activity label, and the latest time stamp for the activity group. As discussed previously in conjunction with FIG. 6, assigning case identifiers to images allows these images to be collated according to a particular case. In FIG. 8, the event log 880 captures handover of tasks from worker ID "WA" to "WB" after the activity group associated with time stamp "1/23/2020 12:38 pm." Although FIG. 8 shows a single event log as an example, in reality, there may be a significant number of event logs for an operation process.

The process mining module 335 performs process mining using the event logs. The process mining module 335 may parse the event logs to extract information and analyze various instances of operation processes. The process mining module 335 may visualize the process flow for a case of an operation process by plotting the sequence in which activities took place based on the time stamps and activity labels included in the event logs. For example, the process mining module 335 may plot the sequence in which workers have accessed certain applications on the worker devices 110. The process mining module 335 may also perform other types of analysis, including but not limited to, statistical analysis, modeling, and the like. The process mining module 335 may identify points-of-interest in the operation process based on the analysis and provide this information to the organization such that the operation process can be improved.

Method of Generating Event Logs from Visual Logs

Figure 9:
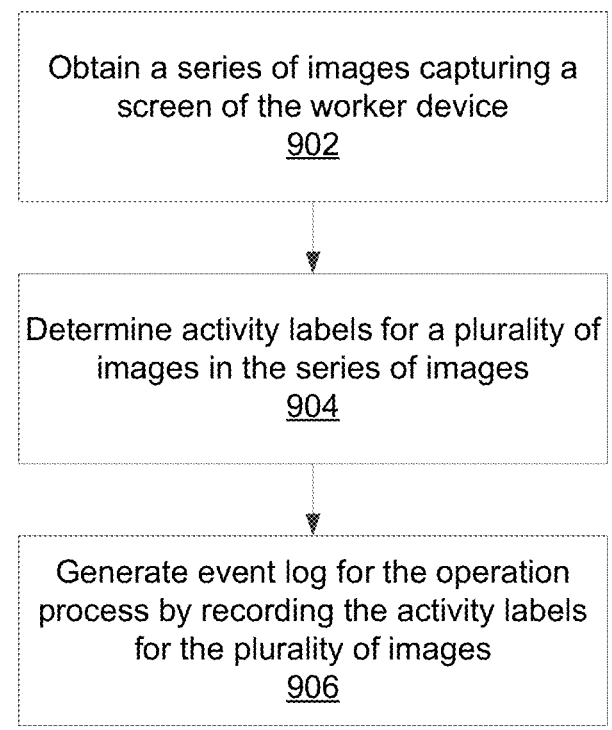
FIG. 9 illustrates a method of generating event logs from video streams of worker devices, in accordance with an embodiment.

FIG. 9 illustrates a method of generating event logs from video streams of worker devices, in accordance with an embodiment. In one embodiment, the process of FIG. 9 is performed by the process mining system 130. Other entities may perform some or all of the steps of the process in other embodiments. Likewise, embodiments may include different and/or additional steps, or perform the steps in different orders.

The process mining system 130 obtains 902 a series of images from a worker device that captures a screen of the worker device while the worker device processes one or more tasks of an operation process. The process mining system 130 determines 904 activity labels for a plurality of images in the series. An activity label for an image indicates an activity performed on the worker device when the image was captured. The activity label for the image is determined by extracting information from pixels of the image and inferring the activity of the worker device from the extracted information. The process mining system 130 generates 906 an event log for the operation process by recording the activity labels for the plurality of images.

Figure 10:
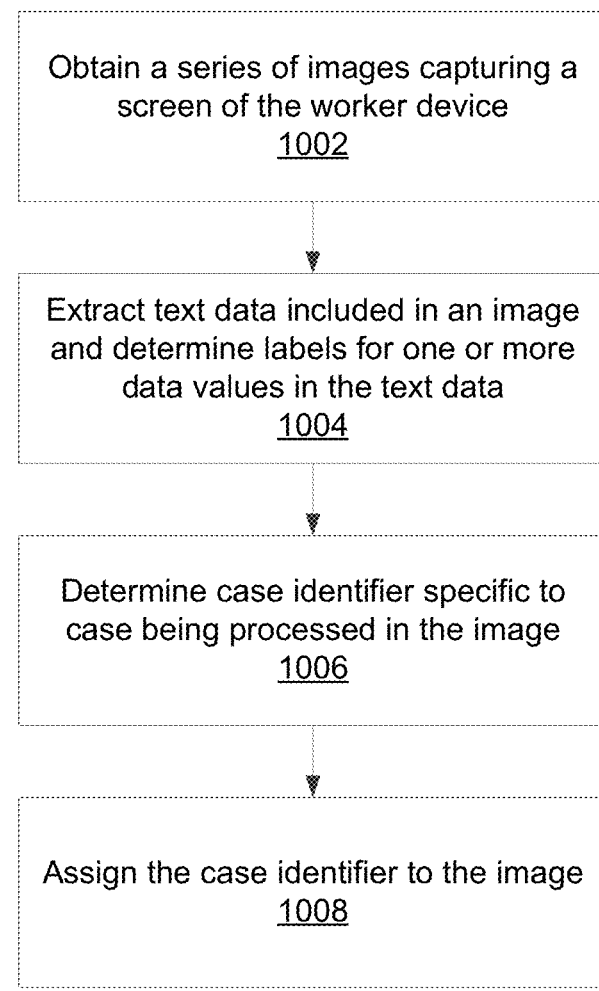
FIG. 10 illustrates a method of assigning a case identifier to video streams of worker devices, in accordance with an embodiment.

FIG. 10 illustrates a method of assigning a case identifier to video streams of worker devices, in accordance with an embodiment. In one embodiment, the process of FIG. 10 is performed by the process mining system 130. Other entities may perform some or all of the steps of the process in other embodiments. Likewise, embodiments may include different and/or additional steps, or perform the steps in different orders.

The process mining system 130 obtains 1002 a series of images from a worker device that captures a screen of the worker device while the worker device processes one or more tasks of an operation process. For each image in a plurality of images, the process mining system 130 extracts 1004 text data included in the image. The text data of the image may include one or more data values. The process mining system 130 also determines labels for the one or more data values in the text data. The process mining system 1006 determines a case identifier specific to a case being processed in the image. The case identifier is determined by identifying a label for the case identifier and determining a data value associated with the label as the case identifier. The process mining system 130 assigns 1008 the case identifier to the image.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of generating event logs from video streams of worker devices, the method comprising:
    obtaining, from a worker device, a series of images capturing a screen of the worker device while the worker device processes one or more tasks of an operation process;
    determining activity labels for a set of images in the series of images, an activity label for an image indicating an activity performed on the worker device when the image was captured, wherein the activity label for the image is determined by extracting information from pixels of the image and inferring the activity of the worker device from the extracted information;
    assigning a case identifier specific to a case being processed in the set of images;
    obtaining, from a second worker device, a second series of images capturing a screen of the second worker device;
    determining activity labels for a second set of images in the second series of images and assigning the case identifier for the case to the second set of images; and
    generating an event log for the operation process for the case identifier by recording the activity labels for the set of images and the second set of images.

2. The method of claim 1, wherein the set of images is captured responsive to an event detected on the worker device.

3. The method of claim 2, wherein the event is at least one of a user pressing on a keyboard connected to the worker device or the user clicking a mouse connected to the worker device.

4. The method of claim 1, further comprising grouping the set of images into one or more activity groups, wherein images of an activity group have a difference in pixel data that is less than a predetermined threshold.

5. The method of claim 1, wherein the activity label for the image is at least one of a name of an application captured in the image, or a category of a task being performed in the image.

6. The method of claim 5, wherein determining the activity labels further comprises:
performing optical character recognition (OCR) on the image to extract text data from the image, and
inferring the activity of the image from the extracted text data.

7. The method of claim 1, wherein each image in the set of images is associated with a time stamp, and the method further comprising:
generating a process map using the event log, the process map visualizing a sequence of the activity labels for the set of images according to the associated time stamps of the set of images.

8. A non-transitory computer-readable storage medium storing executable computer program instructions for generating event logs from video streams of worker devices, the computer program instructions comprising:
obtaining, from a worker device, a series of images capturing a screen of the worker device while the worker device processes one or more tasks of an operation process;
determining activity labels for a set of images in the series of images, an activity label for an image indicating an activity performed on the worker device when the image was captured, wherein the activity label for the image is determined by extracting information from pixels of the image and inferring the activity of the worker device from the extracted information;
assigning a case identifier specific to a case being processed in the set of images;
obtaining, from a second worker device, a second series of images capturing a screen of the second worker device;
determining activity labels for a second set of images in the second series of images and assigning the case identifier for the case to the second set of images; and
generating an event log for the operation process for the case identifier by recording the activity labels for the set of images and the second set of images.

9. The computer-readable storage medium of claim 8, wherein the set of images is captured responsive to an event detected on the worker device.

10. The computer-readable storage medium of claim 9, wherein the event is at least one of a user pressing on a keyboard connected to the worker device or the user clicking a mouse connected to the worker device.

11. The computer-readable storage medium of claim 8, the instructions further comprising grouping the set of images into one or more activity groups, wherein images of an activity group have a difference in pixel data that is less than a predetermined threshold.

12. The computer-readable storage medium of claim 8, wherein the activity label for the image is at least one of a name of an application captured in the image, or a category of a task being performed in the image.

13. The computer-readable storage medium of claim 12, wherein determining the activity labels further comprises:
performing optical character recognition (OCR) on the image to extract text data from the image, and
inferring the activity of the image from the extracted text data.

14. The computer-readable storage medium computer-readable storage medium of claim 8, wherein each image in the set of images is associated with a time stamp, and the instructions further comprising:
generating a process map using the event log, the process map visualizing a sequence of the activity labels for the set of images according to the associated time stamps of the set of images.

15. A system for generating event logs from video streams of worker devices, comprising:
a processor for executing computer program instructions; and
a non-transitory computer-readable storage medium storing computer program instructions executable to perform steps comprising:
obtaining, from a worker device, a series of images capturing a screen of the worker device while the worker device processes one or more tasks of an operation process;
determining activity labels for a set of images in the series of images, an activity label for an image indicating an activity performed on the worker device when the image was captured, wherein the activity label for the image is determined by extracting information from pixels of the image and inferring the activity of the worker device from the extracted information;
assigning a case identifier specific to a case being processed in the set of images;
obtaining, from a second worker device, a second series of images capturing a screen of the second worker device;
determining activity labels for a second set of images in the second series of images and assigning the case identifier for the case to the second set of images; and
generating an event log for the operation process for the case identifier by recording the activity labels for the set of images and the second set of images.

16. The system of claim 15, wherein the set of images is captured responsive to an event detected on the worker device.

17. The system of claim 16, wherein the event is at least one of a user pressing on a keyboard connected to the worker device or the user clicking a mouse connected to the worker device.

18. The system of claim 15, the instructions further comprising grouping the set of images into one or more activity groups, wherein images of an activity group have a difference in pixel data that is less than a predetermined threshold.

19. The system of claim 15, wherein the activity label for the image is at least one of a name of an application captured in the image, or a category of a task being performed in the image.

20. The system of claim 19, wherein determining the activity labels further comprises:
performing optical character recognition (OCR) on the image to extract text data from the image, and
inferring the activity of the image from the extracted text data.

21. The method of claim 1, further comprising determining that handover of the case occurred from the worker device to the second worker device based on the event log.

* * * * *